United States Patent

Sormani et al.

(10) Patent No.: US 8,128,267 B2
(45) Date of Patent: Mar. 6, 2012

(54) LIGHT SOURCE AND ILLUMINATION DEVICE COMPRISING AT LEAST ONE LIGHT-EMITTING ELEMENT

(75) Inventors: Joseph Ludovicus Antonius Maria Sormani, Knegsel (NL); Ralph Hubert Peters, Maastricht (NL); Egbert Lenderink, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 314 days.

(21) Appl. No.: 11/719,014

(22) PCT Filed: Nov. 8, 2005

(86) PCT No.: PCT/IB2005/053656
§ 371 (c)(1),
(2), (4) Date: May 10, 2007

(87) PCT Pub. No.: WO2006/054199
PCT Pub. Date: May 26, 2006

(65) Prior Publication Data
US 2008/0198603 A1 Aug. 21, 2008

(30) Foreign Application Priority Data
Nov. 17, 2004 (EP) .................................... 04105821

(51) Int. Cl.
*F21V 7/04* (2006.01)
(52) U.S. Cl. .................... 362/555; 362/553; 362/554
(58) Field of Classification Search ........... 362/553–555
See application file for complete search history.

(56) References Cited

U.S. PATENT DOCUMENTS

| 4,576,436 | A | | 3/1986 | Daniel et al. |
| 5,353,133 | A | * | 10/1994 | Bernkopf ...................... 362/559 |
| 5,432,876 | A | * | 7/1995 | Appeldorn et al. ........... 362/554 |
| 5,680,209 | A | * | 10/1997 | Machler ........................ 356/319 |
| 5,842,767 | A | | 12/1998 | Rizkin et al. |
| 6,052,135 | A | * | 4/2000 | Ender et al. ................... 347/116 |
| 6,152,588 | A | * | 11/2000 | Scifres ........................... 362/496 |
| 6,350,041 | B1 | | 2/2002 | Tarsa et al. |
| 6,367,941 | B2 | * | 4/2002 | Lea et al. ....................... 362/551 |
| 2002/0010500 | A1 | * | 1/2002 | Chen ............................... 607/89 |
| 2002/0021573 | A1 | | 2/2002 | Zhang |
| 2002/0048163 | A1 | | 4/2002 | Kawakami et al. |
| 2002/0140880 | A1 | | 10/2002 | Weindorf et al. |
| 2003/0072147 | A1 | | 4/2003 | Pashley et al. |
| 2003/0231262 | A1 | | 12/2003 | Janssen |
| 2004/0208019 | A1 | | 10/2004 | Koizumi et al. |

FOREIGN PATENT DOCUMENTS

| EP | 1429395 A2 | 6/2004 |
| WO | 0140702 A1 | 6/2001 |
| WO | 2004100213 | 11/2004 |
| WO | 2004104642 | 12/2004 |

* cited by examiner

*Primary Examiner* — William Carter

(57) ABSTRACT

A light source comprising a light engine (10), especially with at least one LED and/or at least one laser light emitting element, and further comprising a light guide (11) and an out-coupling structure (12) is proposed. By this, a flexible scheme to tailor the source size and radiation characteristic of an LED- or laser based system is provided. The size and the position of the out-coupling structure (12) can be chosen to be comparable to the size and position of the filament or arc of a conventional light source like an incandescent-, halogen- or gas discharge burner. The disclosed LED/laser light source is retrofit from an optical point of view so that it can replace a conventional light source like an incandescent-, halogen- or gas discharge bulb or burner in an illumination device.

4 Claims, 2 Drawing Sheets

Figure 1:
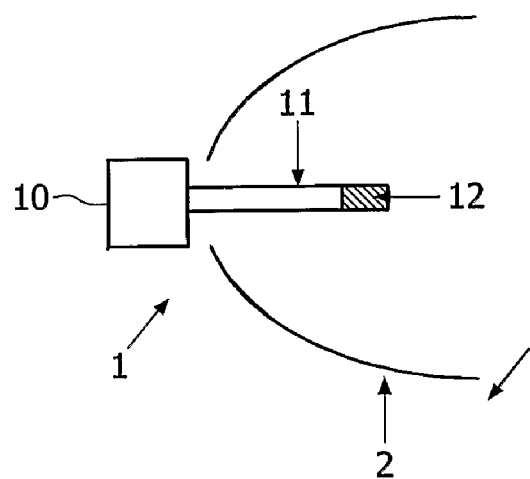

LIGHT SOURCE AND ILLUMINATION DEVICE COMPRISING AT LEAST ONE LIGHT-EMITTING ELEMENT

The invention relates to a light source comprising a light engine, especially with at least one LED and/or at least one laser light-emitting element and especially for replacing at least one conventional light source like an incandescent-, halogen- or gas discharge bulb or burner in an illumination device. The invention further relates to an illumination device comprising a primary optical system with such a light source, especially as a replacement for at least one of said conventional light sources, and a secondary optical system for radiating the generated light and for achieving a desired light radiation characteristic.

LEDs and laser light emitting elements have considerable advantages in comparison to conventional light sources like incandescent-, halogen- or gas discharge bulbs or burners. These advantages are especially a longer lifetime and lower energy consumption. However, there are several differences between both and problems which have to be considered when designing an illumination device with such LED and/or laser light emitting elements in comparison to an illumination device with a conventional light source, or if in a given illumination device a conventional light source shall be replaced by at least one LED and/or at least one laser light emitting element.

At first, the characteristics of the light radiation of these light sources differ from each other considerably. Whereas the conventional light sources emit light in nearly all directions, LEDs emit light only into one hemisphere and laser light emitting elements usually emit light in the form of a narrow beam. Consequently, the light radiation characteristics of the same secondary optical system would differ substantially from each other in each of these three cases.

At second, the excess energy which is the energy applied to the light source which is not converted into light, is with said conventional light sources transferred to the environment mainly by thermal radiation and convection. In contrary to this, in the case of LEDs and laser light emitting elements the excess energy is transferred to the environment mainly by heat conduction via the holder or socket of the element. This could cause premature damage of the illumination device due to overheating when using these elements in a conventional reflector.

US 2002/0021573 A1 discloses lighting devices using LEDs instead of incandescent bulbs. A multicolor LED flashlight comprising a plurality of LED dices with different colors combined into one LED bulb is disclosed as well as a lamp having a bowl shape with LEDs on its face and an electronic circuit board inside the bowl.

Additionally to the problems mentioned above, these lighting devices have the disadvantage that if the radiated light intensity is to be increased, the number of LEDs must be increased accordingly. This, however, may create thermal and other problems not only because of a limited space but also with respect to the fact that no longer all LEDs are in the focal point of a related reflector any more so that the efficiency and the radiation characteristic is degraded.

An object underlying the invention is to provide a light source comprising a light engine, especially with at least one light emitting element like an LED and/or a laser light emitting element, which is retrofit so that it can be used in combination with a conventional secondary optical system like a reflector and/or a lens which is designed especially for the above mentioned conventional light sources and can substitute these without substantially degrading radiation characteristic and/or intensity of light and/or life time due to the above problems especially with respect to overheating.

Furthermore, a light source comprising a light engine, especially with at least one light emitting element like an LED and/or a laser light emitting element, shall be provided with which a light radiation characteristic and/or an intensity of light can be achieved which is at least substantially equal to or even better than the light radiation characteristic and/or the intensity of light, respectively, of a conventional light source.

Finally, an illumination device comprising at least one such light source shall be provided, which device can easily be designed and constructed to achieve a desired radiation characteristic and/or a desired intensity of light.

The object is solved according to claim 1 with a light source comprising a light engine with at least one LED and/or at least one laser light emitting element (or another appropriate light emitting element), for generating and incoupling light into at least one light guide, which is provided with at least one out-coupling structure for out-coupling light, wherein the light guide and/or the out-coupling structure is dimensioned and provided for directing out-coupled light into a designated secondary optical system for achieving a desired light radiation characteristic.

Furthermore, the object is solved according to claim 9 with an illumination device comprising at least one such light source and at least one reflector and/or at least one lens for radiating the generated light and for achieving a desired radiation characteristic.

One considerable advantage of these solutions is the fact, that the dimensions of the out-coupling structure can be provided almost exactly according to the dimensions of a light emitting area of a conventional light source (discharge arc or filament) or it can be provided in the form of a very small dot (or line) which when positioned in the focal point (or focal line, respectively) of a secondary optical system can improve the radiation characteristic considerably.

The light intensity can be increased as required for a specific application by using a light engine with an accordingly increased number of LEDs and/or laser light emitting elements. By careful design, the dimensions of the light emitting area (out-coupling structure) can be kept as low as the etendue conservation law permits.

Furthermore, by appropriately dimensioning the out-coupling structure, the characteristic of light radiation of the light source (e.g. into a specific direction or hemisphere) can easily be adapted to a given reflector which has been designed to have a certain light radiation characteristic and/or intensity of light.

Some of the embodiments are advantageous especially with respect to a preferred application, namely the substitution of conventional light sources.

One particular embodiment of the invention opens the possibility to use several light emitting elements in a simple manner, which is advantageous especially if a very high brightness of the light source is desired.

Some embodiments of the invention employ preferred kinds of light guides which are flexible, small, economical and have a low weight.

Various embodiments of the invention are directed onto various out-coupling structures which can be chosen according to a specific application of the light source.

Figure 2:
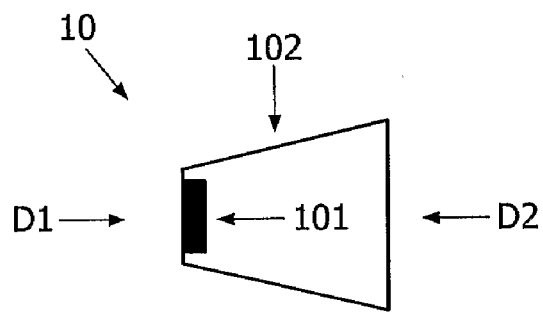
Figure 3:
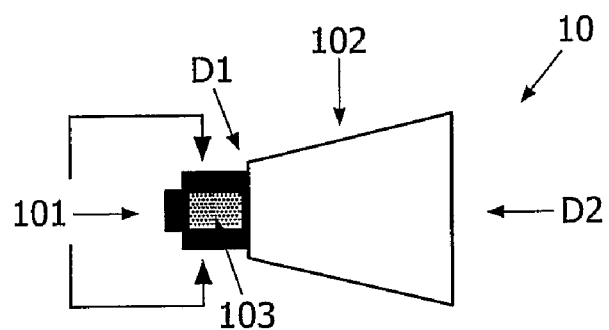
Figure 4:
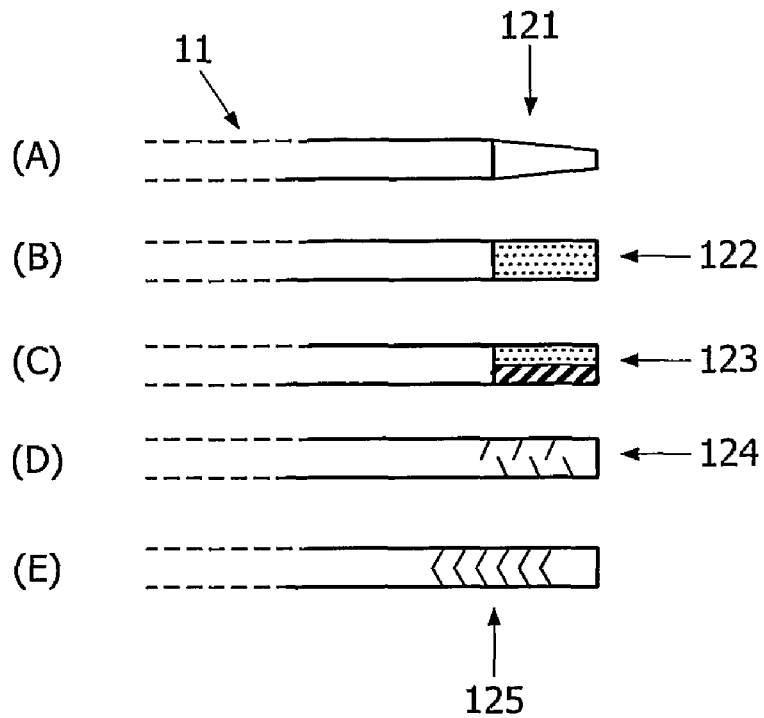
Figure 5:
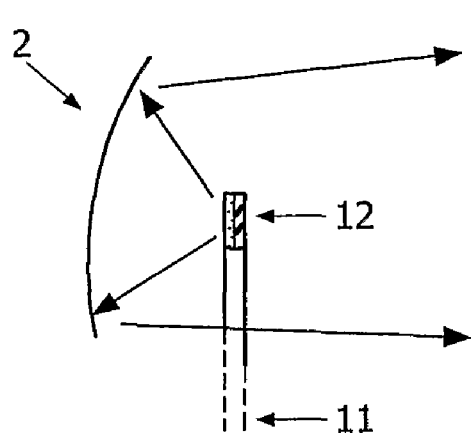
Figure 6:
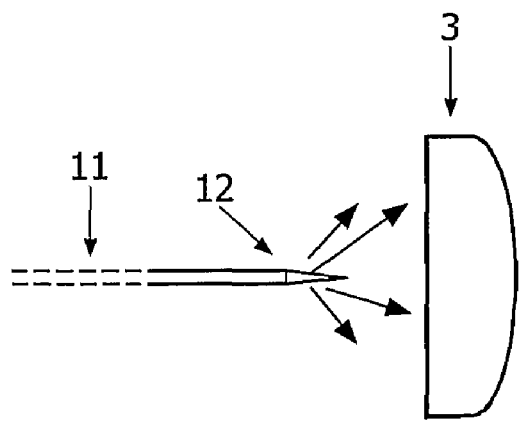

Further details, features and advantages of the invention are disclosed in the following description of exemplary and preferred embodiments in connection with the drawings in which shows:

FIG. 1 a longitudinal cross section through a first embodiment of an illumination device;

FIG. 2 a longitudinal cross section through a first embodiment of a light engine;

FIG. 3 a longitudinal cross section through a second embodiment of a light engine;

FIG. 4 several out-coupling structures;

FIG. 5 a longitudinal cross section through a second embodiment of an illumination device; and FIG. 6 a longitudinal cross section through a third embodiment of an illumination device.

FIG. 1 shows a longitudinal cross section through a first embodiment of an illumination device according to the invention. The illumination device comprises a primary optical system for generating light and for feeding the light to a secondary optical system which is provided for radiating the light and for achieving a desired radiation characteristic.

The primary optical system comprises a light source 1 with a light engine 10, a light guide 11 and an out-coupling structure 12. The secondary optical system comprises a reflector 2.

The light engine 10 comprises at least one light emitting element like an LED and/or a laser light emitting element. The light generated by the light engine 10 is coupled into a first end of the light guide 11 and fed to the out-coupling structure 12 at the second end of the light guide 11 by which the light is directed onto the reflector 2. Preferably, the out-coupling structure 12 is positioned in the focal area (e.g. a focal point or focal line) of the reflector 2 and has a radiation characteristic which is adapted to the form and size of the reflector so that the out-coupled light illuminates the reflector 2 with a minimum loss of light.

FIG. 2 shows a longitudinal cross section through a first embodiment of the light engine 10. The light engine 10 comprises a light emitting element like an LED 101 and a collimator 102 with a conical form having a first smaller opening D1 and a second larger opening D2.

The size and shape of the first opening D1 is adapted to the size and the shape of the light emitting element 101, so that it can be inserted into the first opening in such a manner that the emitted light is coupled almost entirely into the collimator 102. A typical diameter of the first opening D1 for a known LED element is about 1 mm.

The size and the shape of the second opening D2 is adapted to the size and the shape of the cross-section of the first end of the light guide 11 and is dimensioned such that the angular distribution of the light emitted by the collimator 102 is within the TIR angle of the light guide 11. In case of a TIR angle of about 45°, the diameter of the second opening D2 is about 1.4 mm.

By positioning the light engine 10 and especially the light emitting elements 101 outside (and remote to) the reflector 2, a heat sink can be used to eliminate the excess energy of these elements by heat conduction to a sufficient extent so that the problem mentioned above with respect to heat dissipation can be avoided.

FIG. 3 shows a longitudinal cross section through a second embodiment of the light engine 10. This light engine 10 again comprises a collimator 102 with a first and a second opening D1, D2. An optically transparent cube 103 is provided with one of its surfaces in the first opening D1 of the collimator 102. At the other five surfaces of the cube 103 light emitting elements 101 are arranged which emit light into the cube 103 so that it is coupled into the collimator 102.

If the light emitting elements 101 are covered by a phosphor, this embodiment allows for a higher brightness at the input of the light guide 11.

The size and the shape of the second opening D2 of the collimator 102 is again adapted to the size and shape of the cross section of the first end of the light guide 11 and is so dimensioned that the angular distribution of the light emitted by the collimator 102 is within the TIR angle of the light guide 11, so that as much light as possible is coupled into the light guide 11.

With this embodiment comprising five light emitting elements 101, an increased intensity of the light source and the related illumination device can be achieved. For further increasing the intensity of the generated light, the five LED elements 101 are blue LED elements and in the opening of the cube 103 a yellow phosphor layer is applied.

FIGS. 4 (A) to (E) show five different out-coupling structures 121 to 125, respectively, each extending along a length and at least over a part of the circumference of a light guide 11 and preferably at or in the region of its second end.

The length of the out-coupling structures 121 to 125 is for example dimensioned according to the length and size of a filament or an arc of a conventional light source which is to be substituted especially within a given reflector (or, in case of a cylindrical reflector, according to the length of its focal line). On the other hand, for substituting a conventional light source as mentioned above it may as well be desired to achieve a dot like light source.

The out-coupling structures 121 to 125 are further designed to have a light radiation characteristic which is e.g. adapted to a designated secondary optical system (2; 3) in order to achieve a desired radiation characteristic of the related illumination unit.

For certain applications within a given reflector other radiation characteristics may be desired having e.g. a cone like shape for illuminating exclusively a designated reflector or lens, or the light is to be emitted in all directions with the same light intensity.

The out-coupling structures 121 to 125 according to FIG. 4(A) to (E) are provided to achieve these or other dimensions and/or radiation characteristics.

The first out-coupling structure 121 according to FIG. 4(A) has a tapered end substantially in the form of a reversed collector so that the light propagating within the light guide 11 is forced to leave the light guide 11 substantially in the form of a cone or is emitted into one hemisphere.

The second out-coupling structure 122 according to FIG. 4(B) is provided in the form of a length or a section of the light guide 11 whose surface is made diffuse. By this, a diffuse light radiation substantially into a sphere can be achieved which is similar to the radiation characteristic of a filament.

The third out-coupling structure 123 according to FIG. 4(C) divides the light guide 11 into two parallel halves running along its length. A first half is provided for out-coupling and emitting light and is designed in the form e. g. of one of the other out-coupling structures shown in FIG. 4. The second half is e.g. coated with a material or treated in another way so that it is opaque to the light radiation. By this a radiation characteristic can be achieved in which the light is emitted into a space which extends mainly in a direction perpendicular to the length of the light guide 11. For angularly increasing or decreasing this space, the first and the second half can of course extend over more or less than 180°, respectively, of the circumference of the light guide 11.

This embodiment is especially preferred for applications in which the light guide 11 and the out-coupling structure 12 extent into the reflector 2 substantially in a direction perpendicular to the direction of the axis of the reflector 2 as shown in FIG. 5.

The fourth out-coupling structure 124 according to FIG. 4(D) comprises oblique cuts into the light guide 11 so that the light is out-coupled and emitted from the light guide 11 by reflections and/or refractions at these cuts. A desired radiation characteristic can be achieved by selecting the angle between the cuts and the optical axis of a reflector in combination with the angle of the light radiated by a reflector. Another advantage is that the angular characteristic of the light propagating within the light guide is preserved.

Finally, in a similar manner the fifth out-coupling structure 125 according to FIG. 4(E) comprises chevron like lines for out-coupling and emitting light by refraction of the light at these lines. These lines are for example generated by gluing together correspondingly tapered ends of several sections of light guides. For increasing the out-coupling of light, the index of refraction of the glue should be different from that of the material used for the light guides. This embodiment has substantially the same advantages as the fourth embodiment but is mechanically more stable.

FIG. 5 shows a longitudinal cross section through a second embodiment of an illumination device according to the invention which comprises a reflector 2 (secondary optical system) and a light source (primary optical system) with a light guide 11 and an out-coupling structure 12. The out-coupling structure 12 is especially provided in the form of the third embodiment 123 according to FIG. 4(C) so that light is radiated only onto the reflector 2.

In contrary to the first embodiment shown in FIG. 1, the light source 1 and the reflector 2 are asymmetrically arranged to each other to achieve an asymmetric radiation characteristic. Alternatively or additionally, the reflector 2 can be formed asymmetrically with respect to the out-coupling structure 12.

By adapting the light radiation characteristic of the out-coupling structure 12 to the shape and form of the reflector 2, an illumination device with almost any radiation characteristic and any distribution of intensity of light can be achieved with a minimum loss of light.

FIG. 6 shows a longitudinal cross section through a third embodiment of an illumination device according to the invention which again comprises a light guide 11 with an out-coupling structure 12 at its second end. The out-coupling structure 12 has especially the form of the first embodiment 121 shown in FIG. 4(A) and is adapted with respect to its radiation characteristic to the form and shape of the secondary optical system which in this case is a lens 3.

Generally, by dimensioning the out-coupling structure 12 according to the size of a filament or arc of a conventional light source, the inventive light source is optically retrofit and is suitable for replacing conventional light sources without affecting the light radiation characteristic of a given illumination device.

Furthermore, by positioning the light engine 10 and especially the LED and/or laser light elements outside the reflector 2 as shown in FIG. 1, the above mentioned problems with respect to dissipation of heat can be avoided effectively.

By designing and forming the out-coupling structure 12 as for example shown in FIG. 4 in dependence of a certain reflector 2 or a lens 3, an illumination device with virtually any light radiation characteristic and a minimum of loss of light can be achieved.

Finally, it is noted that the light engine 10 could comprise other light emitting elements than LEDs and/or laser light emitting elements as mentioned above. Even a conventional light source could be used, if only the advantages effected by the light guide 11 and the out-coupling structure 12 are relevant for a specific application

The invention claimed is:

1. A light source comprising
a light engine with at least one LED or at least one laser light-emitting element for generating and in-coupling light into at least one light guide comprising
an elongated glass fiber or rod having a long axis, wherein the light guide has as an out-coupling structure for out-coupling light, said out-coupling structure having
a plurality of chevron pieces stacked along the long axis, the chevron pieces attached adjacent to one another with an adhesive and forming an out-coupling length of the light guide,
each of said stacked chevron pieces forming chevron like lines between said plurality of said stacked chevron pieces,
each of said chevron like lines between said plurality of stacked chevron pieces emitting light by refraction through an adhesive retaining adjacent tapered ends of said plurality of said stacked chevron pieces,
wherein the out-coupling structure extends along the out-coupling length and over the entire circumference of the out-coupling length of the light guide,
wherein the light guide and the out-coupling structure are dimensioned and configured for directing out-coupled light in a direction perpendicular to the long axis of the light guide into a designated secondary optical system, and
wherein the designated secondary optical system has at least one reflector or at least one lens having an axis perpendicular to the long axis of the light guide.

2. A light source according to claim 1, wherein the out-coupling structure is configured and dimensioned so that the out-coupled light illuminates substantially exclusively the designated secondary optical system.

3. A light source according to claim 1, wherein the light engine comprises a collimator with a first opening and a second opening wherein the first opening is provided for receiving light from at least one LED or at least one laser light emitting element and the second opening is provided for coupling the light into the light guide.

4. An illumination device comprising a light source according to claim 1, wherein the light engine of the light source is positioned outside the at least one reflector and an out-coupling structure of the light source is positioned at least substantially in a focal area of the at least one reflector.

* * * * *